United States Patent
Ito

(10) Patent No.: US 6,816,157 B2
(45) Date of Patent: Nov. 9, 2004

(54) PERSONAL COMPUTER DISPLAYING DISPLAY DATA INPUTTED FROM ANOTHER PERSONAL COMPUTER

(75) Inventor: Yasuhisa Ito, Yamagata (JP)

(73) Assignee: NEC Corporation, Tokyo (JP)

( * ) Notice: Subject to any disclaimer, the term of this patent is extended or adjusted under 35 U.S.C. 154(b) by 300 days.

(21) Appl. No.: 10/061,163

(22) Filed: Feb. 4, 2002

(65) Prior Publication Data

US 2002/0105511 A1 Aug. 8, 2002

(30) Foreign Application Priority Data

Feb. 2, 2001 (JP) .......................................... 2001-026711

(51) Int. Cl.$^7$ ................................................ G09G 5/00
(52) U.S. Cl. ...................................... 345/211; 713/300
(58) Field of Search ............................. 345/87, 89, 90, 345/204, 205, 210, 213, 214, 629, 634, 535, 188, 637; 710/303; 348/585; 713/300, 324, 310; 340/825, 825.78; 455/166.2

(56) References Cited

U.S. PATENT DOCUMENTS

| | | | | |
|---|---|---|---|---|
| 5,884,049 A | * | 3/1999 | Atkinson | ..................... 710/303 |
| 5,999,997 A | * | 12/1999 | Pipes | ........................ 710/303 |
| 6,178,474 B1 | * | 1/2001 | Hamano et al. | ............. 710/303 |
| 6,374,148 B1 | * | 4/2002 | Dharmarajan et al. | ......... 700/94 |
| 6,473,789 B1 | * | 10/2002 | Chen et al. | .................. 709/213 |
| 6,535,221 B1 | * | 3/2003 | Allen et al. | .................. 345/611 |
| 6,578,101 B1 | * | 6/2003 | Ahern | ........................ 710/306 |
| 6,636,918 B1 | * | 10/2003 | Aguilar et al. | .............. 710/303 |
| 6,657,654 B2 | * | 12/2003 | Narayanaswami | ....... 348/14.04 |
| 6,668,296 B1 | * | 12/2003 | Dougherty et al. | .......... 710/303 |

* cited by examiner

*Primary Examiner*—Amare Mengistu
*Assistant Examiner*—Nitin Patel
(74) *Attorney, Agent, or Firm*—Young & Thompson

(57) ABSTRACT

A computer which displays display data inputted from another computer, while the saving of the electric power is accomplished, includes: a display controller which outputs a first RGB signal; a first control circuit to which electric power, receiving the first RGB signal and a second RGB signal from another personal computer and outputs the first RGB signal or the second RGB signal; an LCD unit which receives the first RBG signal or the second RGB signal; a second control circuit, detecting that the second RGB signal is inputted to the first control circuit; and a power supply circuit always powering the first and second control circuits. The second control circuit controls the first control circuit to output the second RGB signal to the LCD unit and controls the power supply circuit to supply electric power to the LCD unit, when the second control circuit detects that the second RGB signal is inputted to the first control circuit.

20 Claims, 1 Drawing Sheet

PERSONAL COMPUTER DISPLAYING DISPLAY DATA INPUTTED FROM ANOTHER PERSONAL COMPUTER

BACKGROUND OF THE INVENTION

The present invention relates to a personal computer which displays display data inputted from another personal computer.

Recently, in order to differently use the fixed personal computer and the portable personal computer in accordance with their needs, there is a tendency that users increase who possess two computers including a desktop computer and a notebook computer.

Here, as compared with a Liquid Crystal Display (LCD) of the desktop computer, an LCD of the notebook computer is smaller and has a lower brightness. Therefore, it is a convenience that the LCD of the desktop computer can be used as a display of the notebook computer.

Then, there is a conventional desktop computer, which displays display data inputted from a notebook computer as an analog RGB (Red, Green and Blue) signal via a cable. In this conventional desktop computer, it is necessary to convert the analog RGB signal inputted from the notebook computer into a digital RGB signal. Accordingly, the conventional desktop computer is completely switched on, although there are portions, which do not need to be supplied with electric power, for example, a CPU (a Central Processing Unit), a HDD (a Hard Disc Drive) and a memory. Namely, there is a problem that saving power cannot be accomplished in the conventional desktop computer.

SUMMARY OF THE INVENTION

An object of the present invention is to provide a personal computer which displays display data inputted from another personal computer, while the saving of the electric power is accomplished.

According to the present invention, a personal computer includes: a display controller which outputs a first RGB signal; a first control circuit to which electric power is supplied at all times, receiving the first RGB signal and a second RGB signal from another personal computer and outputs the first RGB signal or the second RGB signal; an LCD unit which receives the first RGB signal or the second RGB signal; a second control circuit to which electric power is supplied at all times, detecting that the second RGB signal is inputted to the first control circuit; and a power supply circuit. The second control circuit controls the first control circuit to output the second RGB signal to the LCD unit and controls the power supply circuit to supply electric power to the LCD unit, when the second control circuit detects that the second RGB signal is inputted to the first control circuit.

BRIEF DESCRIPTION OF THE DRAWINGS

These and other objects, features and advantages of the invention will become more apparent from the following detailed description when taken in conjunction with the accompanying drawing, in which.

DESCRIPTION OF THE PREFERRED EMBODIMENTS

Figure 1:
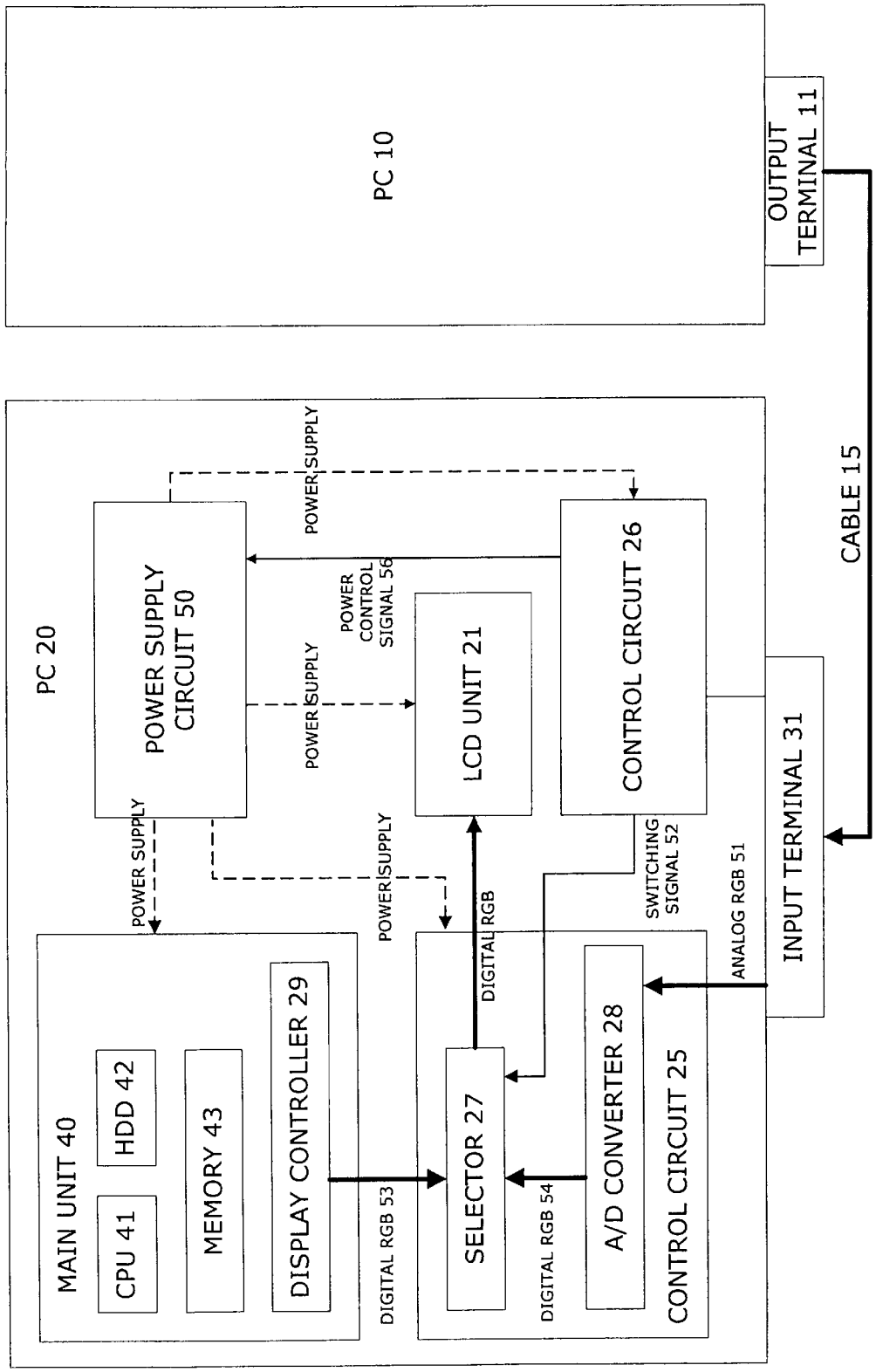
FIG. 1 is a schematic constitutional block diagram showing a personal computer according to the present invention.

Next, the present invention will be explained in detail below in reference to the accompanying drawings.

Referring to FIG. 1, a personal computer 20 of an embodiment of the present invention includes a main unit 40 having a CPU 41, a HDD 42, a memory 43 and a display controller 29, an input terminal 31, a control circuit 25 having a selector 27 and an A/D converter 28, a control circuit 26, a power supply circuit 50 connected to a commercial power source and a digital Liquid Crystal Display unit (a digital LCD unit) 21.

An analog RGB signal 51 outputted from an output terminal 11 of a personal computer 10 is inputted to the A/D converter 28 via a cable 15 and the input terminal 31. The A/D converter 28 converts the analog RGB signal 51 into a digital RGB signal 54. The digital RGB signal is inputted to the selector 27. The display controller 29 outputs a digital RGB signal 53 to the selector 27.

The control circuit 26 checks whether the analog RGB signal 51 is inputted from the input terminal 31. The control circuit 26 controls the selector 27 by a switching signal 52. The control circuit 26 outputs a power control signal 56 for controlling the power supply circuit 50 to supply electric power to the LCD unit 21.

The selector 27 selects either the digital RGB signal 53 or the digital RGB signal 54 and outputs the selected signal to the LCD 21. In detail, in the case that the personal computer 20 is singly used, namely, the personal computer 20 is not connected to the personal computer 10, the selector 27 selects the digital RGB signal 53. On the other hand, in case that the control circuit 26 detects that the cable 15 is connected to the input terminal 31, or that the analog RGB signal 51 is inputted to the control circuit 25, the control circuit 26 controls the selector 27 to select and output the digital RGB signal 54 by the switching signal 52.

Further, in case that the control circuit 26 detects that the cable 15 is connected to the input terminal 31, or that the analog RGB signal 51 is inputted to the control circuit 25, the control circuit 26 controls the power supply circuit 50 to supply the electric power to the LCD unit 21 by the power control signal 56.

Next, a power system of the personal computer 20 will be described.

Firstly, in the case that the personal computer 20 is singly used, namely, the personal computer 20 is not connected to the personal computer 10, the power supply circuit 50 supplies the electric power to the main unit 40, the LCD unit 21, the control circuit 25 and the control circuit 26. Here, the power supply circuit 50 supplies the electric power to the control circuit 25 and the control circuit 26 at all times, even if a power of the personal computer 20 is OFF state.

Next, in case that a power of the personal computer 20 is OFF state and the control circuit 26 detects that the cable 15 is connected to the input terminal 31, or that the analog RGB signal 51 is inputted to the control circuit 25, the power supply circuit 50 starts to supply the electric power to the LCD unit 21 without switching on a power switch (not shown) of the personal computer 20. In this case, the power supply circuit 50 does not supply electric power to the main unit 40. Therefore, display data inputted from the personal computer 10 can be displayed on the LCD unit 21 while the saving of the electric power is accomplished.

In above described embodiment, it is preferable that the personal computer 20 is a desktop computer having a large size LCD and the personal computer 10 is a notebook computer. In this case, there is an effect that drawbacks of a small display size and a screen quality which the notebook personal computer has can be solved.

While this invention has been described in conjunction with the preferred embodiment described above, it will now be possible for those skilled in the art to put this invention into practice in various other manners.

What is claimed is:

1. A computer comprising:

a display controller which outputs a first RGB signal;

a first control circuit, said first control circuit receiving said first RGB signal and a second RGB signal from another personal computer and outputs said first RGB signal or said second RGB signal;

an LCD unit which receives said first RGB signal or said second RGB signal;

a second control circuit, said second control circuit detecting that said second RGB signal is inputted to said first control circuit; and a power supply circuit supplying electric power to said first and second control circuits even when said computer is in an OFF state;

wherein said second control circuit controls said first control circuit to output said second RGB signal to said LCD unit and controls said power supply circuit to supply electric power to said LCD unit, when said second control circuit detects that said second RGB signal is inputted to said first control circuit.

2. The computer of claim 1, wherein when both said first RGB signal and said second RGB signal are received by said first control circuit, said second control circuit automatically senses said second RGB signal and automatically provides a switching signal to the first control circuit so that said second RGB signal is output by said first control circuit to said LCD unit to cause said second RGB signal to always take priority over said first RGB signal in being displayed by said LCD unit.

3. The computer of claim 1, wherein whenever said second RGB signal is received by said first control circuit, regardless of whether said first RGB signal is being received by said first control circuit, said second control circuit automatically provides a switching signal to the first control circuit so that said second RGB signal is output by said first control circuit to said LCD unit to cause said second RGB signal to always take priority over said first RGB signal in being displayed by said LCD unit.

4. The computer of claim 1, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit, while the portions of the computer not associated with the first and second control circuits remain without power from the power supply circuit.

5. The computer of claim 1, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit without switching on a power switch which turns the computer to an ON state.

6. A computer comprising:

a display controller which outputs a first RGB signal;

a first control circuit, said first control circuit receiving said first RGB signal and a second RGB signal from another personal computer via a cable and outputs said first RGB signal or said second RGB signal;

an LCD unit which receives said first RGB signal or said second RGB signal;

a second control circuit, said second control circuit detecting that said cable is connected to said personal computer; and a power supply circuit supplying electric power to said first and second control circuits even when said computer is in an OFF state;

wherein said second control circuit controls said first control circuit to output said second RGB signal to said LCD unit and controls said power supply circuit to supply electric power to said LCD unit, when said second control circuit detects that said cable is connected to said personal computer.

7. The computer of claim 6, wherein when both said first RGB signal and said second RGB signal are received by said first control circuit, said second control circuit automatically senses said second RGB signal and automatically provides a switching signal to the first control circuit so that said second RGB signal is output by said first control circuit to said LCD unit to cause said second RGB signal to always take priority over said first RGB signal in being displayed by said LCD unit.

8. The computer of claim 6, wherein whenever said second RGB signal is received by said first control circuit, regardless of whether said first RGB signal is being received by said first control circuit, said second control circuit automatically provides a switching signal to the first control circuit so that said second RGB signal is output by said first control circuit to said LCD unit to cause said second RGB signal to always take priority over said first RGB signal in being displayed by said LCD unit.

9. The computer of claim 6, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit, while the portions of the computer not associated with the first and second control circuits remain without power from the power supply circuit.

10. The computer of claim 6, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit without switching on a power switch which turns the computer to an ON state.

11. A computer comprising:

a display controller which outputs a first digital RGB signal;

a first control circuit, said first control circuit comprising an A/D converter which receives an analog RGB signal from another personal computer and converts said analog RGB signal into a second digital RGB signal, and a selector which receives said first digital RGB signal and said second digital RGB signal and outputs said first digital RGB signal or said second digital RGB signal;

an LCD unit which receives said first RGB signal or said second RGB signal;

a second control circuit, said second control circuit detecting that said analog RGB signal is inputted to said first control circuit; and a power supply circuit supplying electric power to said first and second control circuits even when said computer is in an OFF state;

wherein said second control circuit controls said selector to output said second digital RGB signal to said LCD unit and controls said power supply circuit to supply electric power to said LCD unit, when said second control circuit detects that said analog RGB signal is inputted to said first control circuit.

12. The computer of claim 11, wherein when both said first RGB signal and said second RGB signal are received by said first control circuit, said second control circuit automatically senses said second RGB signal and automatically provides a switching signal to the first control circuit so that said second RGB signal is output by said first control circuit to said LCD unit to cause said second RGB signal to always take priority over said first RGB signal in being displayed by said LCD unit.

13. The computer of claim 11, wherein whenever said second RGB signal is received by said first control circuit, regardless of whether said first RGB signal is being received by said first control circuit, said second control circuit automatically provides a switching signal to the first control circuit so that said second RGB signal is output by said first control circuit to said LCD unit to cause said second RGB signal to always take priority over said first RGB signal in being displayed by said LCD unit.

14. The computer of claim 11, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit, while the portions of the computer not associated with the first and second control circuits remain without power from the power supply circuit.

15. The computer of claim 11, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit without switching on a power switch which turns the computer to an ON state.

16. A computer comprising:

a display controller which outputs a first digital RGB signal;

a first control circuit, said first control circuit comprising an A/D converter which receives an analog RGB signal from another personal computer via a cable and converts said analog RGB signal into a second digital RGB signal, and a selector which receives said first digital RGB signal and said second digital RGB signal and outputs said first digital RGB signal or said second digital RGB signal;

an LCD unit which receives said first RGB signal or said second RGB signal;

a second control circuit, said second control circuit detecting that said cable is connected to said personal computer; and a power supply circuit supplying electric power to said first and second control circuits even when said computer is in an OFF state;

wherein said second control circuit controls said selector to output said second digital RGB signal to said LCD unit and controls said power supply circuit to supply electric power to said LCD unit, when said second control circuit detects that said cable is connected to said personal computer.

17. The computer of claim 16, wherein when both said first RGB signal and said second RGB signal are received by said first control circuit, said second control circuit automatically senses said second RGB signal and automatically provides a switching signal to the first control circuit so that said second RGB signal is output by said first control circuit to said LCD unit to cause said second RGB signal to always take priority over said first RGB signal in being displayed by said LCD unit.

18. The computer of claim 5, wherein, whenever said second RGB signal is received by said first control circuit, regardless of whether said first RGB signal is being received by said first control circuit, said second control circuit automatically provides a switching signal to the first control circuit so that said second RGB signal is output by said first control circuit to said LCD unit to cause said second RGB signal to always take priority over said first RGB signal in being displayed by said LCD unit.

19. The computer of claim 16, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit, while the portions of the computer not associated with the first and second control circuits remain without power from the power supply circuit.

20. The computer of claim 16, wherein, said power supply circuit responds to the computer going into the OFF state by shutting off power to the LCD unit and to portions of the computer not associated with the first and second control circuits while maintaining power to the first and second control circuits, while the computer is in the OFF state, the second control circuit monitors input of the second RGB signal and, upon the second RGB signal being input to said first control circuit, said second control circuit controls said first control circuit to output said second RGB signal to said LCD unit and controls said power supply circuit to supply power to said LCD unit without switching on a power switch which turns the computer to an ON state.

* * * * *